April 1, 1941.  J. WAHL  2,236,585

TIRE VALVE

Filed Feb. 25, 1939

INVENTOR
John Wahl,
BY
Moser, Myers Mauley
ATTORNEYS.

Patented Apr. 1, 1941

2,236,585

UNITED STATES PATENT OFFICE 2,236,585

TIRE VALVE

John Wahl, Rosedale, N. Y., assignor to Scovill Manufacturing Company, Waterbury, Conn., a corporation of Connecticut Application February 25, 1939, Serial No. 258,483

3 Claims. (Cl. 251—144)

My present invention relates to tire valves and aims to provide certain improvements therein. More particularly it relates to an all-metal tire valve core or valve insides so constituted as to insure air-tightness between the valve check member and its seat by the force of a valve seating spring of sufficient tension, independently of any supplemental valve seating means.

The tire valves in almost universal use at present on the tires of automobiles, buses, motor trucks, etc. are of the type consisting of a valve stem or casing within which is removably mounted a valve core. This valve core usually comprises a plug provided with a rubber packing adapted to seat against an internal shoulder in the valve stem and a check valve member which is also provided with a rubber packing or disc which is held against a valve seat by a spring supplemented by the fluid pressure within the tire. Under normal conditions of use such valves have proven highly efficient and satisfactory. Under abnormal conditions, however, for example, where the location of the valve in proximity to the brake-band of a wall subjects the valve parts to high temperature, it has been found that the rubber packings under the influence of heat tend to flow or thin out, thus giving rise to imperfect seals with the consequent loss of air from the tires. Under conditions of continuous vibration this tendency toward leakage is aggravated. As a concomitant of these conditions the life of the tires which are thus caused to operate at less than prescribed pressures are materially shortened, thereby substantially decreasing the operating efficiency and increasing the operating cost of vehicles, the tires of which are so effected.

According to my present invention I provide a tire valve for overcoming the deficiencies inherent in conventional tire valves when used under adverse operating conditions. This I accomplish by eliminating from the tire valve the rubber packings which are adversely affected by heat and substituting in lieu thereof metal to metal seals. Moreover, I also preferably so construct the valve as to be useable with the conventional tire valve stems wherein the internal valve seat shoulder is relied upon to provide a metal to metal seal instead of a rubber to metal seal. I also construct the valve check member so as to make a metal to metal seal with its seat independently of any supplemental seating means.

The invention will be better understood from the detailed description which follows, when considered in connection with the accompanying drawing showing a preferred embodiment, and wherein.

Figure 1:
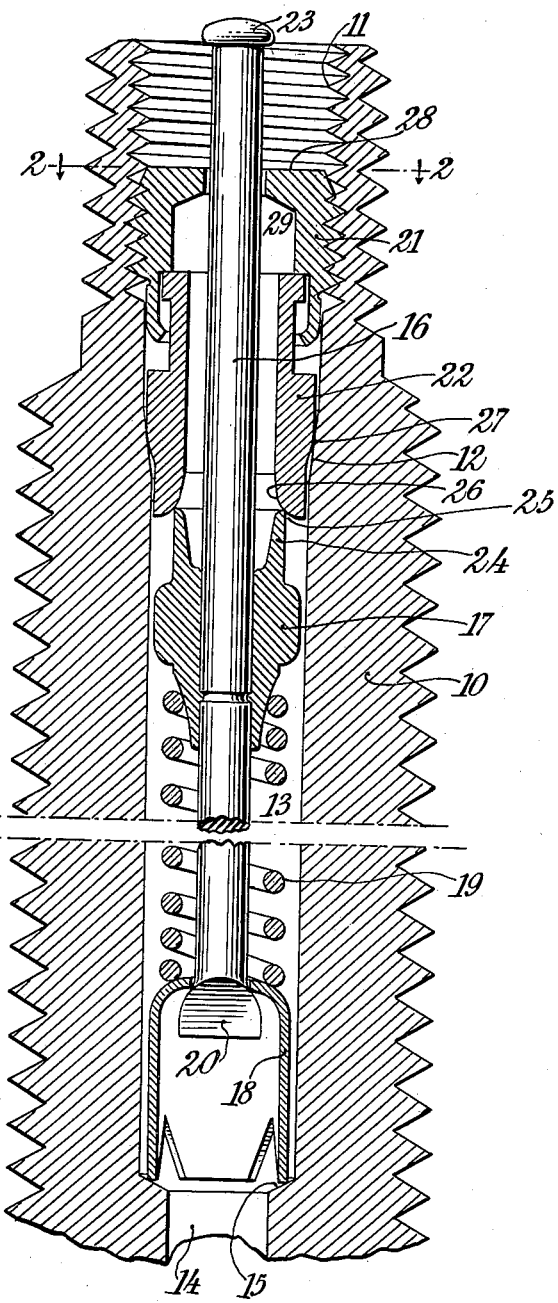
Figure 1 is a longitudinal section through a tire valve embodying my invention.
Figure 2:
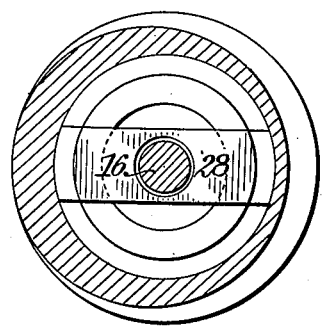
Fig. 2 is a section taken substantially along the plane of the line 2—2 of Fig. 1.

Referring to the drawing, I have shown my invention as applied to a conventional metallic tire valve stem or casing 10 having an axial bore therethrough which at its outer end is internally screw-threaded at 11 and is formed below said screw-threaded portion with a tapered shoulder 12 which leads to a valve chamber 13 which in turn connects with a reduced bore 14 to provide a shoulder 15.

Mounted within the tire valve stem 10 is a tire valve core or valve insides embodying my invention and consisting of a straight valve pin 16 having fixedly mounted thereon, intermediate its ends, a valve check member 17. Loosely mounted on the valve pin, and adapted to seat on the shoulder 15, is a spring cup 18 between the top of which and the underside of the valve check member 17 is a helical spring 19. To hold the spring and spring cup in assembled relation on the valve pin, the lower end of the pin is swaged and enlarged as indicated at 20. Also, loosely mounted on the valve pin above the valve check member is a tubular screw-threaded plug 21 and a tubular valve seat member 22, the said parts being swivelly-connected together in a well-known manner. To hold the parts 21 and 22 against disengagement from the pin, the head of the pin is enlarged as indicated at 23.

The valve check member 17 at its upper end is formed in spaced relation to the valve pin with an annular wall 24 which terminates at its free end in a sharp feathered edge 25. For cooperative engagement with said sharp feathered edge of the valve check member the valve seat member 22 has the wall of its bore adjacent the valve check member flared outwardly as indicated at 26 to provide a feathered edge. Preferably, this outwardly flared wall is smooth and rounded to promote the formation of an air-tight seal with the valve check member. The valve seat member, above its feathered edge above mentioned, is also formed with an external rounded shoulder 27 adapted to seat against the tapered shoulder 12 in the valve stem when the valve seat member is forced down onto said shoulder in said stem through the agency of the screw-threaded plug 21.

Preferably, the openings through the spring cup 18 and the screw-threaded plug 21 through which the valve pin 16 extends are axially disposed with respect to said parts and are of a diameter but slightly larger than the valve pin so as to provide means for aligning the valve core parts and guiding the movements of the valve check member when mounted in the valve stem. To further insure such guided movement of the valve check member, the latter is made of a diameter but slightly less than that of the bore of the valve chamber 13. However, if desired, the valve check member may be made of smaller diameter and provided with fins or with a spider for guiding it within the valve chamber. To insure adequate flow of air through the valve plug 21, the upper portion thereof is cut away on opposite sides parallel to a diameter thereof to provide a tool engaging portion 28 and lateral openings 29 on opposite sides thereof communicating with the bore through the valve seat member.

In order to insure an air-tight seal between the edge 25 of the valve check member and the seating surface 26 of the valve seat member, the said parts are preferably formed of hard brass which will "give" slightly under applied force. The requisite force necessary to provide such air-tight seal is provided by the spring 19 which is formed of music wire and wound to provide a tension many times greater than that afforded by the brass wire springs usually employed in valve cores. The tension of the spring 19 is made sufficient to insure an air-tight seal between the valve check and valve seat independently of any supplemental valve seating means.

While I have shown and described a preferred embodiment of my invention, it is to be understood that I do not wish to be limited to the precise details of construction disclosed since these may be varied within the range of engineering skill without departing from the spirit of the invention as claimed.

What I claim is:

1. A tire valve core or valve insides, comprising a valve pin having rigidly mounted thereon a valve check member and having loosely mounted thereon a tubular valve seat member, and a spring for holding the valve check member seated on the valve seat member when the tire valve core is mounted within a tire valve stem or casing, said valve seat member at its end adjacent the valve check member having a bore, the wall of which is smooth and flared outwardly to provide a feathered edge, the valve check member having an annular wall with a feathered edge of a diameter to engage the outwardly flared wall of the valve seat member, the said valve seat and valve check members being formed of metal which is adapted to "give" under the force of the spring and the spring having a tension sufficient to hold the feathered edge of the valve check member in air-tight engagement with the valve seat member independently of any supplemental valve seating means when the valve core is mounted within a tire valve stem.

2. A tire valve core or valve insides according to claim 1, wherein the outwardly flared bore wall of the valve seat member is rounded in a direction longitudinally of the axis of the bore wall and the feathered edge of the valve check member is sharp and adapted to engage said rounded surface of the valve seat member.

3. A tire valve core or valve insides, comprising a valve pin having rigidly mounted thereon, intermediate its ends, a valve check member and loosely mounted thereon a spring cup, a spring disposed between the spring cup and the valve check member, a tubular valve seat member for engagement by the valve check, and a screw-threaded plug swively connected to the valve seat member, the plug having a tool engaging portion with lateral openings and an axial opening therethrough, the spring cup having an axial opening therethrough, said axial openings being of but slightly larger diameter than the valve pin for maintaining said parts in assembled aligned relation on the pin, said valve seat member, at its end adjacent the valve check member, having a bore the wall of which is smooth and flared outwardly to provide a feathered edge, the valve check member having an annular wall with a sharp feathered edge of a diameter to engage the outwardly flared wall of the valve seat member, the said valve seat and valve check members being formed of metal which is adapted to "give" under the force of the spring and the spring having a tension sufficient to hold the edge of the valve check member in air-tight engagement with the valve seat member independently of any supplemental valve seating means when the valve core is mounted within a tire valve stem.

JOHN WAHL.